United States Patent
Besier et al.

(10) Patent No.: US 10,358,119 B2
(45) Date of Patent: Jul. 23, 2019

(54) BRAKING SYSTEM FOR A MOTOR VEHICLE

(71) Applicant: Continental Teves AG & Co. oHG, Frankfurt (DE)

(72) Inventors: Marco Besier, Bad Schwalbach (DE); Stefan Drumm, Saulheim (DE); Paul Linhoff, Neu-Anspach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/625,487

(22) Filed: Jun. 16, 2017

(65) Prior Publication Data
US 2017/0282877 A1 Oct. 5, 2017

Related U.S. Application Data

(63) Continuation of application No. PCT/EP2015/078947, filed on Dec. 8, 2015.

(30) Foreign Application Priority Data

Dec. 16, 2014 (DE) .................. 10 2014 225 958

(51) Int. Cl.
*B60T 8/40* (2006.01)
*B60T 8/88* (2006.01)
(Continued)

(52) U.S. Cl.
CPC .......... *B60T 8/4086* (2013.01); *B60T 8/4081* (2013.01); *B60T 8/885* (2013.01); *B60T 13/142* (2013.01);
(Continued)

(58) Field of Classification Search
CPC ...... B60T 8/4081; B60T 8/4086; B60T 8/885; B60T 13/142; B60T 13/686;
(Continued)

(56) References Cited

U.S. PATENT DOCUMENTS 3,542,055 A * 11/1970 Belart .................... B60T 11/26
137/255
8,812,210 B2 * 8/2014 Inoue .................... B60T 7/042
180/315
(Continued)

FOREIGN PATENT DOCUMENTS

CN 103313889 A 9/2013
DE 4014052 A1 11/1991
(Continued)

OTHER PUBLICATIONS

International Preliminary Report on Patentability dated Aug. 12, 2015 from corresponding International Patent Application No. PCT/EP2015/078947.
(Continued)

*Primary Examiner* — Thomas W Irvin

(57) ABSTRACT

A brake system comprises a first electrohydraulic open-loop and closed-loop control unit. The first electrohydraulic control unit comprises a master brake cylinder actuatable by a brake pedal; a first electrically controllable pressure-providing device; and an electrically controllable pressure-modulating device sets wheel-specific brake pressures for the wheel brakes. The electrically controllable pressure-modulating device has at least one electrically actuatable inlet valve for each wheel brake. A first pressure-medium reservoir for supplying the first electrohydraulic control unit with pressure medium is arranged on the first electrohydraulic control unit. The brake system also comprises a second electrohydraulic open-loop and closed-loop control unit, which comprises a second electrically controllable pressure-providing device for actuating at least some of the wheel brakes and electrically actuatable valves. A second pressure-medium reservoir for supplying the second electrohydraulic control unit with pressure medium is provided, the second (Continued)

pressure-medium reservoir being arranged on the second electrohydraulic control unit.

19 Claims, 2 Drawing Sheets

(51) Int. Cl.
    *B60T 13/14* (2006.01)
    *B60T 13/68* (2006.01)
    *B60T 17/00* (2006.01)
    *B60T 17/22* (2006.01)

(52) U.S. Cl.
    CPC .......... *B60T 13/686* (2013.01); *B60T 17/002* (2013.01); *B60T 17/225* (2013.01); *B60T 2270/402* (2013.01); *B60T 2270/403* (2013.01); *B60T 2270/404* (2013.01); *B60T 2270/413* (2013.01); *B60T 2270/414* (2013.01); *B60T 2270/82* (2013.01)

(58) Field of Classification Search
    CPC ................ B60T 17/002; B60T 17/225; B60T 2270/402; B60T 2270/403; B60T 2270/404; B60T 2270/413; B60T 2270/414; B60T 2270/82
    See application file for complete search history.

(56) References Cited

U.S. PATENT DOCUMENTS

| | | | | |
|---|---|---|---|---|
| 8,911,030 B2* | 12/2014 | Ohnishi | .................. | B60T 7/042 303/114.1 |
| 8,926,027 B2* | 1/2015 | Shimada | ................. | B60T 7/042 303/10 |
| 9,050,956 B2* | 6/2015 | Hotani | .................. | B60T 8/4081 |
| 9,109,613 B2* | 8/2015 | Ito | ........................... | F15B 15/00 |
| 9,145,119 B2* | 9/2015 | Biller | .................... | B60T 8/4081 |
| 9,199,622 B2* | 12/2015 | Okano | ..................... | B60T 8/48 |
| 9,205,821 B2* | 12/2015 | Biller | .................... | B60T 8/4081 |
| 9,302,662 B2* | 4/2016 | Murayama | .............. | B60T 8/368 |
| 9,308,905 B2* | 4/2016 | Biller | .................... | B60T 8/4081 |
| 9,545,905 B2* | 1/2017 | Ohnishi | ................ | B60T 8/4081 |
| 9,845,085 B2* | 12/2017 | Besier | .................... | B60T 7/042 |
| 2008/0230337 A1* | 9/2008 | Kajiyama | ................. | B60T 1/10 188/352 |
| 2010/0206673 A1* | 8/2010 | Hitzel | ....................... | B60L 7/24 188/106 R |
| 2012/0193975 A1* | 8/2012 | Ishii | ....................... | B60T 8/4081 303/14 |
| 2013/0127240 A1* | 5/2013 | Noro | ........................ | B60T 13/58 303/14 |
| 2014/0028084 A1* | 1/2014 | Biller | .................... | B60T 8/4081 303/9.62 |
| 2014/0110997 A1* | 4/2014 | Biller | .................... | B60T 8/4081 303/9.62 |
| 2015/0020520 A1* | 1/2015 | Feigel | ....................... | B60T 8/36 60/534 |
| 2015/0025767 A1* | 1/2015 | Feigel | ....................... | B60T 8/36 701/70 |
| 2015/0061854 A1* | 3/2015 | Drumm | .................. | B60T 7/042 340/453 |
| 2016/0023644 A1* | 1/2016 | Feigel | .................... | B60T 8/4081 303/3 |
| 2017/0274884 A1* | 9/2017 | Besier | ................... | B60T 13/662 |
| 2017/0361825 A1* | 12/2017 | Drumm | .................. | B60T 8/363 |
| 2018/0162332 A1* | 6/2018 | Nakazawa | ............... | B60T 8/00 |

FOREIGN PATENT DOCUMENTS

| | | |
|---|---|---|
| DE | 102004025638 A1 | 9/2005 |
| DE | 102008010528 A1 | 9/2008 |
| DE | 102012205861 A1 | 10/2012 |
| DE | 102012210809 A1 | 1/2013 |
| EP | 2641799 A1 | 9/2013 |
| JP | 2010179799 A | 8/2010 |
| KR | 20140023369 A | 2/2014 |
| WO | WO2012150120 A1 | 11/2012 |

OTHER PUBLICATIONS

International Search Report and Written Opinion dated Jan. 3, 2016 from corresponding International Patent Application No. PCT/EP2015/078947.
Chinese Office Action dated Dec. 31, 2018 for corresponding Chinese Patent Application No. 201580067583.2.
Korean Office Action dated Sep. 30, 2018 for corresponding Korean Patent Application No. 10-2017-7014568.

* cited by examiner

BRAKING SYSTEM FOR A MOTOR VEHICLE

CROSS-REFERENCE TO RELATED APPLICATIONS

This application claims the benefit of PCT International application No. PCT/EP2015/078947, filed Dec. 8, 2015, which claims the benefit of German patent application No. 10 2014 225 958.4, filed Dec. 16, 2014, each of which are hereby incorporated by reference herein.

TECHNICAL FIELD

This invention is related to a hydraulic brake system for a motor vehicle.

BACKGROUND

Hydraulic vehicle braking systems can be implemented as external vehicle braking systems and in addition to a master brake cylinder actuated by muscle power, to which the wheel brakes are hydraulically connected and which provides the pressure and volume for operating wheel brakes. An electrically controlled pressure and volume supply device actuates the wheel brakes in a "brake-by-wire" operating mode. In the event of failure of the electrically controlled pressure and volume supply device, operation of the wheel brakes is carried out solely by the muscle power of the driver of the vehicle.

It is to be expected that in the future vehicle braking systems will also come into use that are suitable for automatically driving vehicles. Said braking systems could be in principle be externally actuated systems or "brake-by-wire" systems. This means that a braking demand is made by means of electronic or electrical control signals and can be implemented by the system without the aid of the driver. In this case, for safety reasons sufficiently high availability of the braking system or the externally actuated braking function is desired.

In DE 10 2012 205 861 A1, a "brake-by-wire" braking system is described, which in addition to a brake pedal-operated master brake cylinder comprises a first and a second pressure supply device. The second pressure supply device is arranged to increase the pressure in each of the brake circuits for supplying the wheel brakes compared to the pressure supplied by the master brake cylinder. The driver of the vehicle can thus comfortably achieve an adequate service brake deceleration despite a failure of the first pressure supply device.

The master brake cylinder, the first pressure supply device, the isolating valves, the supply valves and the simulator with the simulator release valve are disposed in the first module with the first electronic control and regulating unit, and the second pressure supply device and the inlet and outlet valves are disposed in the second module with the second electronic control and regulating unit. Just one pressure medium reservoir is provided, which is disposed on the first module.

The suction sides of the pumps of the second pressure supply device of the second module are likewise hydraulically connected to said pressure medium reservoir. In the event of a small leak in the hydraulic connection between the second module and the pressure medium reservoir disposed on the first module, the leak could not be detected rapidly enough by the container warning device of the pressure medium reservoir, so that the pump of the second pressure supply device sucks air in via the small leak and thus contaminates the two brake circuits with air.

Furthermore, the pressure ports of the second pressure supply device are connected to the input-side connections of the inlet valves of the wheel brakes, so that the inlet valves are disposed between the respective pressure port of the second pressure supply device and the wheel brake. Because of the throttling effect of the inlet valves, obstruction of the flow of pressure medium that is output by the second pressure supply to the wheel brake can occur.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY OF THE INVENTION

It is the object of the present invention to provide a braking system for a motor vehicle that high reliability in relation to the availability of the braking system. In particular, the safety requirements of highly automated driving or of autonomous driving will be met by the braking system.

The braking system has a first electrohydraulic control and regulating unit with a first electrically controlled pressure supply device and a first pressure medium reservoir disposed on the first electrohydraulic control and regulating unit for supplying the first electrohydraulic control and regulating unit, and a second electrohydraulic control and regulating unit with a second electrically controlled pressure supply device and a second pressure medium reservoir disposed on the second electrohydraulic control and regulating unit for supplying the second electrohydraulic control and regulating unit.

Thus, the availability of externally actuated or electrically controlled braking is increased. In the case of a leak in the region of a suction line of one of the pressure supply devices, braking can continue to be carried out by means of the other pressure supply device, without the brake circuits being contaminated with air.

According to one development, the first pressure medium reservoir and the second pressure medium reservoir each comprise a level detector or a level alarm. This enables the first electrohydraulic control and regulating unit and the second electrohydraulic control and regulating unit to be monitored separately from each other for a loss of pressure medium. If a loss of pressure medium in one of the electrohydraulic control and regulating units is detected, then only said electrohydraulic control and regulating unit can be deactivated.

The second pressure medium reservoir may be designed to act as an air separator. Thus, even if there is a leak in the region of a suction line of the second electrohydraulic control and regulating unit, suction of air and contamination of the brake circuits is initially prevented.

The first electrohydraulic control and regulating unit preferably has a first electronic control and regulating unit and a first hydraulic control and regulating unit.

The second electrohydraulic control and regulating unit preferably has a second electronic control and regulating unit and a second hydraulic control and regulating unit.

The braking system can preferably be actuated in a "brake-by-wire" operating mode both by the driver of the vehicle and also independently of the driver of the vehicle, in the context of an autonomous driving function. The braking system is preferably usually operated in the "brake-by-wire" operating mode and can be operated in at least one fallback mode.

A first electrical power supply unit and a second electrical power supply unit, which is independent of the first power supply unit, are provided. The first electrohydraulic control and regulating unit is supplied with electrical energy by the first power supply unit and the second electrohydraulic control and regulating unit is supplied with electrical energy by the second power supply unit. In the event of a failure of one of the power supply units, electrically controlled braking can continue to be carried out.

In one embodiment, the first pressure supply device is implemented for operating the wheel brakes of the braking system, whereas the second pressure supply device is only implemented for operating some of the wheel brakes.

The first pressure medium reservoir and the second pressure medium reservoir can be structurally separate.

The first electrohydraulic control and regulating unit and the second electrohydraulic control and regulating unit may be disposed spaced apart in the motor vehicle.

According to another embodiment of the braking system, the second pressure supply device comprises at least two hydraulic pumps, both commonly driven by an electric motor and each with an intake port and a pressure port, wherein each of the pressure ports is connected to one of the wheel brakes without the interposition of a valve. This means that the pressure port is connected to the wheel brake directly, i.e. without the interposition of a valve or via a further hydraulic component. Throttling effects are avoided by this. Each of the pressure ports of the pumps may be connected to just one wheel brake. For example, the wheel brakes are the wheel brakes of the front wheels.

The pressure ports of the pumps may be connected to a connecting line between the wheel brake and the output-side port of the associated inlet valve.

The pressure ports of the pumps may be connected to the wheel brakes of different master brake cylinder brake circuits.

The second pressure medium reservoir preferably comprises a hydraulic port, wherein the intake ports of the second pressure supply device are connected to the port.

Alternatively, the second pressure medium reservoir comprises a first hydraulic port and a second hydraulic port, wherein the first port is connected to the intake port of one pump and the second port is connected to the intake port of the other pump.

The intake ports of the second pressure supply device are preferably connected to the port via respective non-return valves opening towards the intake port.

According to another development, a third pressure medium reservoir, at atmospheric pressure, has a filling opening, and is provided for supplying the first and the second pressure medium reservoirs with pressure medium and is connected to the first and the second pressure medium reservoirs.

Alternatively, the first pressure medium reservoir comprises a filling opening and is connected to the second pressure medium reservoir for supplying pressure medium to the second pressure medium reservoir.

The braking system has for each pressure chamber of the master brake cylinder an electrically operated, normally open, isolating valve for the hydraulic connection or isolation of the master brake cylinder to or from the wheel brakes associated with the pressure chamber. The isolating valve is in each case disposed in a hydraulic connecting line between the pressure chamber of the master brake cylinder and a section of brake circuit supplying the associated inlet valves with pressure, and thus enables the selective closing or opening of the hydraulic connection between the pressure chamber and the section of brake circuit.

For each pressure chamber of the master brake cylinder an electrically operated, normally closed, supply valve for the hydraulic connection or isolation of the first pressure supply device to or from the wheel brakes is provided. The supply valve is disposed in each case in a hydraulic connecting line between the first pressure supply device and the section of brake circuit and thus enables the selective opening or closing of the hydraulic connection between the first pressure supply device and the section of brake circuit.

The braking system has a simulator, which provides the driver of the vehicle with a pleasant brake pedal feel in the "brake-by-wire" operating mode. The simulator can be hydraulically connected to at least one pressure chamber of the master brake cylinder by means of an electrically or mechanically operated simulator release valve.

A first electronic control and regulating unit is implemented for actuating the first electrically controlled pressure supply device in the sensor of regulating or controlling the hydraulic pressure that is output by said pressure supply device. Furthermore, the isolating valves and supply valves, the simulator release valve and the pressure modulator of the braking system are regulated or controlled by the first electronic control and regulating unit.

The pressure modulator has an electrically operated inlet valve and an electrically operated outlet valve for adjusting wheel-specific brake pressures for each wheel brake.

The first electrically controlled pressure supply device is formed by a cylinder-piston arrangement, the piston of which can be operated by an electromechanical actuator. Such an electromechanical actuator operates dynamically and very quietly and tolerates the number of load changes necessary for braking systems without problems.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Further embodiments of the invention are revealed by the subordinate claims and the following description using figures wherein:

DETAILED DESCRIPTION

Figure 1:
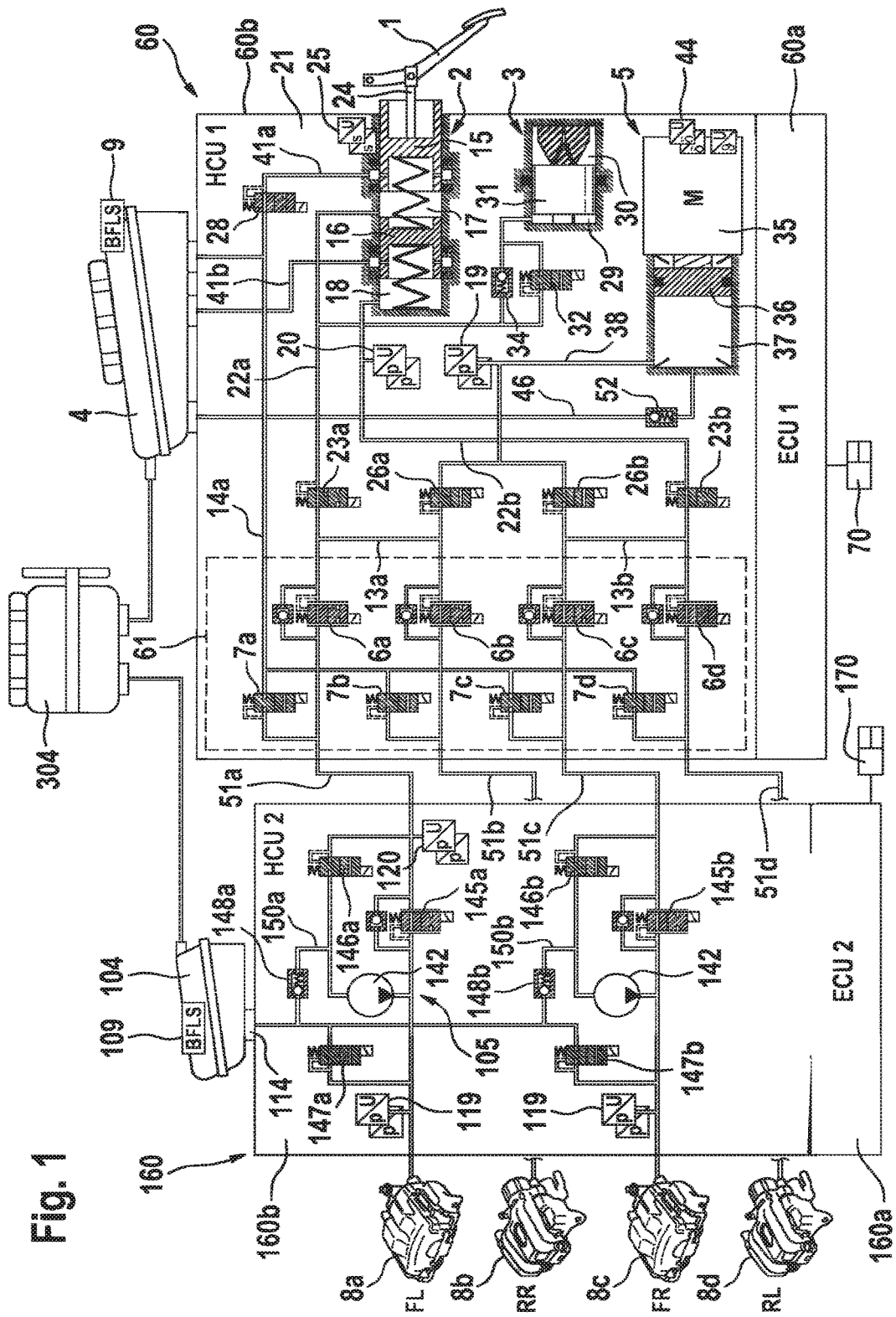
FIG. 1 shows schematically a first exemplary embodiment of a braking system according to the invention.

In FIG. 1, a first exemplary embodiment of a braking system is represented schematically. The braking system essentially comprises a first electrohydraulic control and regulating unit 60 and a second electrohydraulic control and regulating unit 160. Said units are implemented as separate units or standalone assemblies.

The first electrohydraulic control and regulating unit 60 comprises a first electronic control and regulating unit 60a (ECU1) and a first hydraulic control and regulating unit 60b (HCU1). Essentially, a master brake cylinder 2 that can be operated by means of a brake pedal 1, a simulator 3 that works in conjunction with the master brake cylinder 2, a first electrically controlled pressure supply device 5 and an electrically controlled pressure modulator 61 for setting wheel-specific brake pressures are disposed in the first hydraulic control and regulating unit 60b.

A first pressure medium reservoir 4 at atmospheric pressure for supplying the first electrohydraulic control and regulating unit 60 with pressure medium is disposed on the first electrohydraulic control and regulating unit 60.

The second electrohydraulic control and regulating unit 160 comprises a second electronic control and regulating unit 160a (ECU2) and a second hydraulic control and regulating unit 160b (HCU2). Essentially, a second electrically controlled pressure supply device 105 and electrically operated valves 145a, 145b, 146a, 146b, 147a, 147b are disposed in the second hydraulic control and regulating unit 160b.

A second pressure medium reservoir 104 at atmospheric pressure for supplying the second electrohydraulic control and regulating unit 160 with pressure medium is disposed on the second electrohydraulic control and regulating unit 160.

For example, a third pressure medium reservoir 304 at atmospheric pressure is provided, which is connected to the first pressure medium reservoir 4 and the second pressure medium reservoir 104 and supplies said reservoirs with pressure medium as a type of primary container. The third pressure medium reservoir 304 comprises a filling opening for filling the braking system with pressure medium during maintenance processes.

Alternatively, the first pressure medium reservoir that is disposed on the first electrohydraulic control and regulating unit 60 can also be implemented as a primary container with a filling opening that supplies the second pressure medium reservoir 104 with pressure medium.

A respective level detector 9, 109 or level alarm is provided for the first pressure medium reservoir 4 and for the second pressure medium reservoir 104, by means of which in each case the level of pressure medium is detected or the level of pressure medium falling below a predetermined level of the respective pressure medium reservoir 4, 104 is detected. This enables the loss of pressure medium at the second electrohydraulic control and regulating unit 160 to be sensed separately from a loss of pressure medium at the first electrohydraulic control and regulating unit 60. Conversely, the loss of pressure medium at the first control and regulating unit 60 can also be detected by the level detector 9 of the pressure medium reservoir 4. Accordingly, the respective control and regulating units 60, 160 can thus sense such leakage defects separately from each other. In the case of a leak, the affected control and regulating unit can then be deactivated, whereas the other control and regulating unit continues to be ready to carry out braking.

If only one pressure medium reservoir were to be provided for both control and regulating units 60, 160, on detecting a leak at the pressure medium reservoir both control and regulating units 60, 160 would have to be deactivated. An externally actuated or electrically controlled build-up of brake pressure would then not be possible at all.

The pressure medium reservoir 104 of the second control and regulating units 160 is implemented such that the pressure medium reservoir 104 acts as an air separator, for example owing to the geometry thereof. That is, that air present in the intake line can settle in the pressure medium reservoir 104 when the pumps 142 are sucking. However, the air does not pass further to the pumps 142, at least not before the level detector 109 or level alarm indicates a low level.

The pressure modulator 61 comprises at least one electrically operated inlet valve 6a-6d for each wheel brake. For example, for each wheel brake 8a-8d of a motor vehicle that is not shown the pressure modulator 61 comprises an inlet valve 6a-6d and an outlet valve 7a-7d, which are connected together hydraulically in pairs via center ports and are connected to the wheel brakes 8a-8d. The input ports of the inlet valves 6a-6d are supplied via brake circuit sections 13a, 13b with pressures that are derived from a system pressure in a "brake-by-wire" operating mode, said system pressure being present in a system pressure line 38 that is connected to a pressure chamber 37 of the first electrically controlled pressure supply device 5.

A respective non-return valve that opens towards the brake circuit sections 13a, 13b is connected in parallel with each of the inlet valves 6a-6d and is not specified in detail. In a fallback mode, the brake circuit sections 13a, 13b can be supplied with a pressure of the master brake cylinder 2 via hydraulic lines 22a, 22b. The output ports of the outlet valves 7a-7d are connected to the first pressure medium reservoir 4 via a return line 14a. For detecting the pressure prevailing in the system pressure line 38, a redundantly implemented pressure sensor 19 is provided. For example, the wheel brakes 8a or 8b are associated with the left front wheel FL or the right rear wheel RR and the wheel brakes 8c or 8d are associated with the right front wheel FR or the left rear wheel RL (so-called diagonal split).

The master brake cylinder 2 has two pistons 15, 16 that are disposed one after the other in a housing 21 and that bound pressure chambers 17, 18. On the one hand, the pressure chambers 17, 18 are connected to the first pressure medium reservoir 4 via radial bores formed in the pistons 15, 16 and suitable pressure equalization lines 41a, 41b (the pressure equalization line 41a is shown partly combined with the return line 14a, but separate lines are also possible), wherein the connections can be shut off by a relative movement of the pistons 15, 16 in the housing 21.

On the other hand, the pressure chambers 17, 18 are connected to the aforementioned brake circuit sections 13a, 13b by means of the hydraulic lines 22a, 22b. A normally open (SO—) diagnostic valve 28 is disposed in the pressure equalization line 41a. The pressure chambers 17, 18 accommodate restoring springs that are not specified in detail and that position the pistons 15, 16 in an initial position when the master brake cylinder 2 is not being actuated. A piston rod 24 couples the pivoting motion of the brake pedal 1 resulting from pedal actuation to the translational motion of the first (master cylinder) piston 15, the operating displacement of which is detected by a preferably redundantly implemented displacement sensor 25. As a result, the corresponding piston displacement signal represents a measure of the brake pedal actuation angle. It represents a braking demand of a driver of the vehicle.

An isolating valve 23a, 23b, by means of which the pressure chambers 17, 18 can be hydraulically isolated from the brake circuit sections 13a, 13b, is disposed in each of the hydraulic connections 22a, 22b.

The hydraulic connection between the master brake cylinder 2 and the wheel brakes 8a-8d can also be shut off by the isolating valves 23a, 23b. The isolating valves 23a, 23b are implemented as electrically operated, normally open (SO—) 2/2-way valves. A pressure sensor 20 connected to the line section 22b detects the pressure built up in the pressure chamber 18 by a displacement of the second piston 16.

The simulator 3 is hydraulically coupled to the master brake cylinder 2 and consists essentially of a simulator chamber 29, a simulator spring chamber 30 and a simulator piston 31 isolating the two chambers 29, 30 from each other. The simulator piston 31 is supported on the housing 21 by an elastic element (for example a spring) that is disposed in the simulator spring chamber 30 and that is pretensioned. The simulator chamber 29 can be connected to the first pressure chamber 17 of the master brake cylinder 2, for example by means of an electrically operated simulator release valve 32. With a determined pedal force and the simulator release valve 32 activated, pressure medium flows from the master brake cylinder pressure chamber 17 into the simulator chamber 29. A non-return valve 34 that is disposed hydraulically antiparallel to the simulator release valve 32 enables a substantially unhindered return flow of the pressure medium from the simulator chamber 29 to the master brake cylinder pressure chamber 17 independently of the switch state of the simulator release valve 32.

The simulator 3 imparts a pleasant brake pedal feel to the driver of the vehicle in the "brake-by-wire" operating mode.

The first electrically controlled pressure supply device 5 is implemented as a hydraulic cylinder-piston arrangement or a single-circuit electrohydraulic actuator (linear actuator), the pistons 36 of which can be actuated by a schematically indicated electric motor 35 with the interposition of a likewise schematically represented rotations-translation gearbox. A rotor position sensor that is used for the detection of the rotor position of the electric motor 35 and that is only schematically indicated is denoted by the reference character 44.

In addition, a temperature sensor can also be used for detecting the temperature of the motor winding. The piston 36 bounds the pressure chamber 37. The actuator pressure produced by the force action of the piston 36 on the pressure medium enclosed within the pressure chamber 37 is fed into the system pressure line 38 and detected by the system pressure sensor 19. In the "brake-by-wire" operating mode, the system pressure line 38 is connected to the brake circuit sections 13a, 13b via the supply valves 26a, 26b. In this way, a build-up and reduction of brake pressure are carried out for all the wheel brakes 8a-8d during normal braking.

During the build-up of brake pressure, the pressure medium previously displaced from the pressure chamber 37 of the actuator 5 into the wheel brakes 8a-8d flows back into the pressure chamber 37 of the actuator 5 via the same paths. By contrast, during braking with different wheel-specific wheel brake pressures that are regulated using the pressure modulation valves 6a-6d, 7a-7d, the component of the pressure medium discharged via the outlet valves 7a-7d flows into the first pressure medium reservoir 4. It is possible to suck pressure medium back into the pressure chamber 37 by returning the piston 36 with the supply valves 26a, 26b closed, wherein pressure medium flows from the first reservoir 4 into the actuator pressure chamber 37 via a connecting line 46 with a suction valve 52 that is implemented as a non-return valve that opens in the flow direction to the actuator.

The output ports of the inlet valves 6a-6d of the first electrohydraulic control and regulating unit 60 are each connected to just one of the wheel brakes 8a-8d via a respective hydraulic connection 51a-51d. In this case, the second electrohydraulic control and regulating unit 160 is for example hydraulically disposed between the first electrohydraulic control and regulating unit 60 and the wheel brakes 8a and 8c. The inlet valves 6b, 6d are connected directly to the wheel brakes 8b and 8d via the hydraulic connections 51b, 51d, which for example run outside the unit 160. The second electrohydraulic control and regulating unit 160 is implemented for applying pressure or setting pressure at the wheel brakes 8a and 8c. In the case of a failure of the first pressure supply device 5, pressure medium volumes can be made available for the wheel brakes 8a and 8c by activating the second pressure supply device 105.

It is also possible that the second electrohydraulic control and regulating unit 160 is implemented for applying pressure or setting pressure at all wheel brakes 8a, 8b, 8c and 8d.

For each wheel brake respective normally open, analogue-activated control valves 145a, 145b with a parallel connected non-return valve that opens towards the wheel brake are disposed in the connections 51a and 51c, each of which connects the wheel brake 8a or 8c to the output-side port of the inlet valve 6a or 6c associated therewith or to the input-side port of the outlet valve 7a or 7c associated therewith.

For building up wheel brake pressure, furthermore an electrically operated, normally closed, discharge valve 147a, 147b is provided for each wheel brake 8a and 8c, by means of which the wheel brake can be connected to the second pressure medium reservoir 104.

The second electrohydraulic control and regulating unit 160 comprises for example two pumps 142 as the second electrically controlled pressure supply device 105, which are commonly driven by an electric motor that is not shown. The second pressure medium reservoir 104 comprises a hydraulic port 114 to which the intake ports of the pumps 142 are connected, wherein a respective non-return valve 148a, 148b that opens towards the intake port is disposed in a line section 150a, 150a between the intake port and the port 114. The intake ports of the pumps 142 can furthermore be connected to the associated connection section of the connection 51a or 51c between the inlet valve 6a or 6c and the control valve 145a or 145b via respective electrically operated, advantageously normally closed, pressure medium supply valves 146a, 146b. The pressure port of one pump 142 is connected to the wheel brake 8a and the pressure port of the other pump 142 is connected to the wheel brake 8c, in each case without the interposition of a valve.

The pressure supply device 105 thus sucks pressure medium from the second pressure medium reservoir 104 and supplies the pressure medium that it outputs into the wheel brakes 8a and 8c directly in each case (without interposed valves).

The pressure supply function of the second electrohydraulic control and regulating unit 160 operates by means of the valves 145a and 145b, each of which regulates the pressure of the pressure medium volume supplied by the pumps 142 by suitable electronic actuation. Excess pressure medium volume that overflows to the valves 145a, 145b can be directly made available to the corresponding pump 142 again by means of the valves 146a, 146b.

According to an exemplary embodiment that is not shown of the braking system according to the invention, the valves 146a, 146b and the connecting line thereof are not present. In said exemplary embodiment, the excess pressure medium volume flows to the pressure medium reservoir via the first control and regulating unit 60.

The second control and regulating unit 160 comprises for example a pressure sensor 120 for detection of the input pressure in the connection 51a and a respective pressure sensor 119 for detection of the wheel brake pressure in each wheel brake 8a and 8c.

The first pressure medium reservoir 4 is thus used for supplying the first electrohydraulic control and regulating unit 60, in particular of the master brake cylinder 2, and the first pressure supply device 5.

The second pressure medium reservoir 104 is used for supplying the second electrohydraulic control and regulating unit 160, in particular the second pressure supply device 105.

The first electronic control and regulating unit 60a (ECU1) is used for actuating the pressure supply device 5, the valves 23a, 23b, 26a, 26b, 32 for changing between the "brake-by-wire" operating mode and the fallback mode and the valves 6a-6d, 7a-7d of the pressure modulator 61. The signals of the displacement sensors 25, of the sensor 44 and the pressure sensors 19 and 20 are fed to the control and regulating unit 60a.

The second electronic control and regulating unit 160a (ECU2) is used for actuating the pressure supply device 105 and the valves 142a, 142b, 146a, 146b, 147a, 147b. The signals of the pressure sensors 119 and 120 are fed to the control and regulating unit 160a.

For performing the regulation task, signals are also exchanged via one or more buses, for example. Depending on the implementation, a direct connection between the first and the second electronic control and regulating units can also be provided. To safeguard the functions, the level display of the second level detector 9 is read in directly into the second electronic control and regulating unit 160a. Furthermore, depending on the implementation, wheel sensor signals are read in by the second electronic control and regulating unit 160a.

The signals of the level detector 9 are advantageously fed to the first electronic control and regulating unit 60a (ECU1) and the signals of the level detector 109 are fed to the second electronic control and regulating unit 160a (ECU2) and are processed there.

A first electrical power supply unit 70 and a second electrical power supply unit 170, which is independent of the first power supply unit, are provided. The first electrohydraulic control and regulating unit 60 is supplied with electrical energy by the first power supply unit 70, whereas the second electrohydraulic control and regulating unit 160 is supplied with electrical energy by the second power supply unit 170.

In a normal operating mode of the braking system, the wheel brakes 8a-8d are supplied with brake pressure by means of the first pressure supply device 5 of the first electrohydraulic control and regulating unit 60. In the event of a failure of the first pressure supply device 5 or the first electrohydraulic control and regulating unit 60, the wheel brakes 8a, 8c can be supplied with brake pressure by means of the second pressure supply device 105 of the second electrohydraulic control and regulating unit 160. Thus, redundant, externally actuated or electrically controlled brake pressure generation is highly reliably provided, for example for an autonomous driving function.

Figure 2:
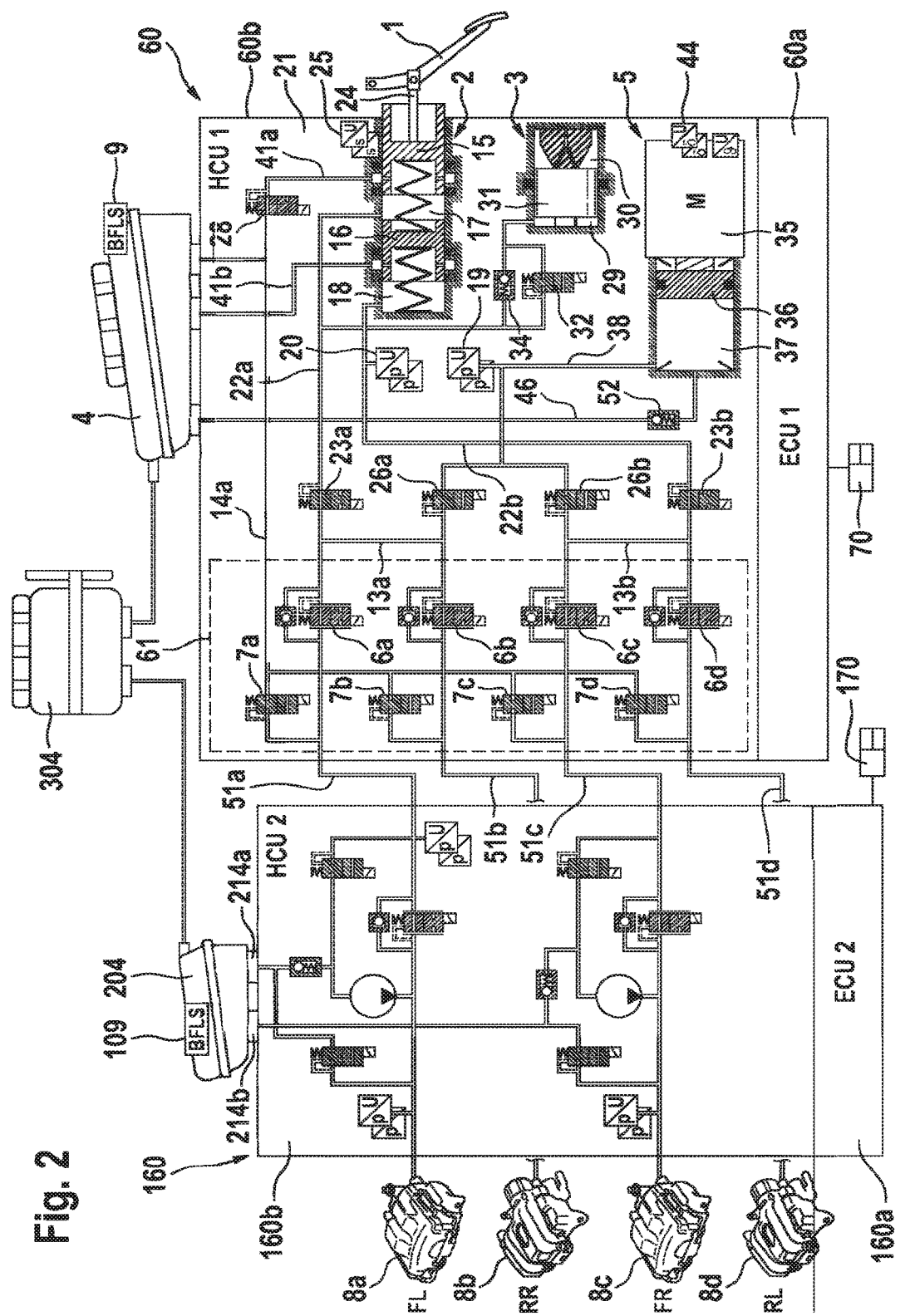
FIG. 2 shows schematically a second exemplary embodiment of a braking system according to the invention.

In FIG. 2 a second exemplary embodiment of a braking system is schematically represented. The braking system essentially corresponds to the braking system of the first exemplary embodiment and essentially comprises a first electrohydraulic control and regulating unit 60, on which a first pressure medium reservoir 4 is disposed, and a second electrohydraulic control and regulating unit 160, on which a second pressure medium reservoir 204 is disposed. The control and regulating units 60, 160 are implemented as separate units or standalone assemblies. Whereas the second pressure medium reservoir 104 of the first exemplary embodiment of FIG. 1 only comprises one hydraulic port 114, to which both pump intake sides are connected, the pressure medium reservoir 104 thus being implemented with one circuit in this sense, the second pressure medium reservoir 204 of the second exemplary embodiment of FIG. 2 is implemented with two circuits. The second pressure medium reservoir 204 comprises a first hydraulic port 214a and a second hydraulic port 214b, wherein each of the ports 214a, 214b is connected to just one of the intake ports of the pumps 142. The remaining components of the second exemplary embodiment correspond to those of the first exemplary embodiment.

According to the second exemplary embodiment a respective level detector 9, 109 or level alarm is also provided for the first pressure medium reservoir 4 and for the second pressure medium reservoir 104, by means of which in each case the level of pressure medium or a decrease of the level of pressure medium below a predetermined level of the respective pressure medium reservoir 4, 204 is detected.

The pressure medium reservoir 204 of the second control and regulating unit 160 is implemented such that the pressure medium reservoir 204 acts as an air separator.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A braking system for a motor vehicle for actuating hydraulically actuated wheel brakes comprising:
   a first electrohydraulic control and regulating unit which comprises;
      a master brake cylinder actuated by a brake pedal to actuate the wheel brakes in a fallback mode;
      a first electrically controlled pressure supply device to actuate the wheel brakes in a "brake-by-wire" mode;
      a simulator connected to the brake pedal;
   an electrically controlled pressure modulator which sets wheel-specific brake pressures for the wheel brakes, wherein the electrically controlled pressure modulator has at least one electrically operated inlet valve for each of the wheel brakes;
   a first pressure medium reservoir at atmospheric pressure, wherein the first pressure medium reservoir is disposed on the first electrohydraulic control and regulating unit;
   a second electrohydraulic control and regulating unit which comprises:
      a second electrically controlled pressure supply device to actuate at least two of the wheel brakes; and
      electrically operated valves; and
   a second pressure medium reservoir at atmospheric pressure, wherein the second pressure medium reservoir is disposed on the second electrohydraulic control and regulating unit.

2. The braking system of claim 1, wherein the first pressure medium reservoir and the second pressure medium reservoir are structurally separate from one another.

3. The braking system of claim 1, further comprising one of level detector and a level alarm for each of the first pressure medium reservoir and the second pressure medium reservoir.

4. The braking system of claim 1, wherein the second pressure medium reservoir acts as an air separator.

5. The braking system of claim 1, further comprising:
a first electrical power supply unit;
a second electrical power supply unit, which is independent of the first electrical power supply unit; and
wherein the first electrohydraulic control and regulating unit is supplied with electrical energy by the first electrical power supply unit and the second electrohydraulic control and regulating unit is supplied with electrical energy by the second electrical power supply unit.

6. The braking system of claim 1, wherein the first electrohydraulic control and regulating unit and the second electrohydraulic control and regulating unit are disposed spaced apart from one another in the motor vehicle.

7. The braking system of claim 1, wherein the second pressure supply device further comprises at least two hydraulic pumps that are commonly driven by a motor, each defining an intake port and a pressure port, wherein each of the pressure ports is connected to one of the wheel brakes without the interposition of a valve.

8. The braking system of claim 7, wherein the second pressure medium reservoir comprises a single hydraulic port, wherein the intake ports of the second electrically controlled pressure supply device are connected to the single hydraulic port.

9. The braking system of claim 8, wherein the intake ports of the second electrically controlled pressure supply device are connected to the single hydraulic port via a respective non-return valve that opens towards the intake port.

10. The braking system of claim 7, wherein the second pressure medium reservoir comprises a first hydraulic port and a second hydraulic port, wherein the first hydraulic port is connected to the intake port of one pump and the second hydraulic port is connected to the intake port of an other pump.

11. The braking system of claim 10, wherein the first hydraulic port is connected to the intake port of one pump and the second hydraulic port is connected to the intake port of the other pump via a respective non-return valve that opens towards the intake port.

12. The braking system of claim 11, wherein a third pressure medium reservoir at atmospheric pressure defines a filling opening and is connected to the first and the second pressure medium reservoirs for supplying the first and the second pressure medium reservoirs with pressure medium.

13. The braking system of claim 1, wherein the first pressure medium reservoir defines a filling opening and is connected to the second pressure medium reservoir for supplying the second pressure medium reservoir with pressure medium.

14. A braking system for a motor vehicle for actuating hydraulically actuated wheel brakes comprising:
a first electrohydraulic control and regulating unit which comprises;
a master brake cylinder actuated by a brake pedal to actuate the wheel brakes in a fallback mode;
a first electrically controlled pressure supply device to actuate the wheel brakes in a "brake-by-wire" mode;
a simulator connected to the brake pedal;
an electrically controlled pressure modulator which sets wheel-specific brake pressures for the wheel brakes, wherein the electrically controlled pressure modulator has at least one electrically operated inlet valve for each of the wheel brakes;
a first pressure medium reservoir at atmospheric pressure, wherein the first pressure medium reservoir is disposed on the first electrohydraulic control and regulating unit;
a second electrohydraulic control and regulating unit which comprises:
a second electrically controlled pressure supply device to actuate at least two of the wheel brakes; and
electrically operated valves; and
a second pressure medium reservoir at atmospheric pressure, wherein the second pressure medium reservoir is disposed on the second electrohydraulic control and regulating unit;
wherein the second electrically controlled pressure supply device further comprises at least two hydraulic pumps that are commonly driven by an electric motor, each defining an intake port and a pressure port, wherein each of the pressure ports is connected to one of the wheel brakes without the interposition of a valve.

15. The braking system of claim 14, wherein the second pressure medium reservoir comprises a single hydraulic port, wherein the intake ports of the second electrically controlled pressure supply device are connected to the single hydraulic port.

16. The braking system of claim 15, wherein the intake ports of the second electrically controlled pressure supply device are connected to the single hydraulic port via a respective non-return valve that opens towards the intake port.

17. The braking system of claim 14, wherein the second pressure medium reservoir comprises a first hydraulic port and a second hydraulic port, wherein the first hydraulic port is connected to the intake port of one pump and the second hydraulic port is connected to the intake port of an other pump.

18. The braking system of claim 17, wherein the first hydraulic port is connected to the intake port of one pump and the second hydraulic port is connected to the intake port of the other pump via a respective non-return valve that opens towards the intake port.

19. The braking system of claim 18, wherein a third pressure medium reservoir at atmospheric pressure defines a filling opening and is connected to the first and the second pressure medium reservoirs for supplying the first and the second pressure medium reservoirs with pressure medium.

* * * * *